United States Patent
Ren et al.

(10) Patent No.: US 12,537,625 B2
(45) Date of Patent: Jan. 27, 2026

(54) SYSTEM AND METHOD FOR ENHANCING AN UPLINK TRANSMISSION MESSAGE

(71) Applicant: ZTE CORPORATION, Guangdong (CN)

(72) Inventors: Min Ren, Shenzhen (CN); Xianghui Han, Shenzhen (CN); Junfeng Zhang, Shenzhen (CN); Jing Shi, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 386 days.

(21) Appl. No.: 18/111,069

(22) Filed: Feb. 17, 2023

(65) Prior Publication Data

US 2023/0209607 A1 Jun. 29, 2023

Related U.S. Application Data

(63) Continuation of application No. PCT/CN2020/119639, filed on Sep. 30, 2020.

(51) Int. Cl.
*H04L 1/08* (2006.01)
*H04W 74/0833* (2024.01)

(52) U.S. Cl.
CPC ........... *H04L 1/08* (2013.01); *H04W 74/0833* (2013.01)

(58) Field of Classification Search
CPC ......... H04W 74/0833; H04W 72/0446; H04W 72/232; H04L 1/08
See application file for complete search history.

(56) References Cited

U.S. PATENT DOCUMENTS 9,451,639 B2 9/2016 Li et al.
10,003,513 B2 * 6/2018 Yu ........................ H04B 17/309
(Continued)

FOREIGN PATENT DOCUMENTS

CN 110035536 A 7/2019
CN 110475374 A 11/2019
(Continued)

OTHER PUBLICATIONS

First Office Action for CN Appl. No. 202080104529.1, dated Dec. 9, 2024 (with English translation, 23 pages).
(Continued)

*Primary Examiner* — Shawn D Miller
(74) *Attorney, Agent, or Firm* — Foley & Lardner LLP (57) ABSTRACT

A system and method for wireless communication are disclosed herein. The system and method are configured to determine a first type of repetitive transmission based on one or more random access related parameters, and send a random access message according to the first type. The system and method are configured to determine a first number of repetitive transmission based on one or more random access related parameters, and send a random access message one or more times according to the first number. The system and method are configured to determine whether to enhance an uplink transmission based on one or more random access related parameters. The system and method are further configured to determine not to enhance the uplink transmission, and send a legacy random access message. The system and method are configured to determine to enhance the uplink transmission, and send an enhanced random access message.

13 Claims, 5 Drawing Sheets

(56) References Cited

U.S. PATENT DOCUMENTS

| | | | |
|---|---|---|---|
| 2011/0075620 A1* | 3/2011 | Jang | H04W 28/18 |
| | | | 370/329 |
| 2018/0279376 A1* | 9/2018 | Dinan | H04W 74/0836 |
| 2019/0159213 A1* | 5/2019 | Baldemair | H04L 5/0094 |
| 2020/0221502 A1 | 7/2020 | Pjanic et al. | |
| 2020/0337029 A1* | 10/2020 | Yi | H04W 72/23 |
| 2021/0076384 A1* | 3/2021 | MolavianJazi | H04W 74/0833 |
| 2022/0053575 A1* | 2/2022 | He | H04W 56/004 |

FOREIGN PATENT DOCUMENTS

| | | |
|---|---|---|
| CN | 110809258 A | 2/2020 |
| KR | 10-2016-0114688 A | 10/2016 |
| KR | 10-2016-0146887 A | 12/2016 |
| WO | WO-2015/161464 A1 | 10/2015 |
| WO | WO-2020/060075 A1 | 3/2020 |

OTHER PUBLICATIONS

International Search Report and Written Opinion for PCT Appl. No. PCT/CN2020/119639, mailed Jun. 24, 2021 (9 pages).

Mediatek Inc.: "Impact of Enhanced coverage on other physical Channels" 3GPP TSG-RAN2 #84 Meeting; R2-134074; Nov. 15, 2013; San Francisco, USA (4 pages).

Samsung: "Random Access Procedure in NR" 3GPP TSG-RAN WG2 Meeting #94; R2-163372; May 27, 2016; Nanjing, China (7 pages).

Extended European Search Report for EP Appl. No. 20955776.8, dated Jul. 20, 2023 (6 pages).

Office Action for KR Appl. No. 10-2023-7006369, dated Sep. 8, 2025 (with English translation, 9 pages).

* cited by examiner

SYSTEM AND METHOD FOR ENHANCING AN UPLINK TRANSMISSION MESSAGE

CROSS-REFERENCE TO RELATED APPLICATION

This application claims the benefit of priority under 35 U.S.C. § 120 as a continuation of International Patent Application No. PCT/CN2020/119639, filed on Sep. 30, 2020, the disclosure of which is incorporated herein by reference in its entirety.

TECHNICAL FIELD

The disclosure relates generally to wireless communications and, more particularly, to systems and methods for enhancing an uplink transmission message.

BACKGROUND

Wireless communication service covers more and more application scenarios, with the increasing degree of social digitization. Among them, enhanced mobile broadband, ultra-reliable and low latency communication and massive machine type of communication have become three major scenarios supported by fifth generation (5G) systems. However, conventional systems may not effectively meet coverage requirements for uplink transmission to transmit low-latency and high-reliability services within a short transmission time. Thus, a technological solution for enhancing an uplink transmission message is desired.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one implementation, the system and method are configured to determine a first type of repetitive transmission based on one or more random access related parameters, and send a random access message according to the first type.

In another implementation, the system and method are configured to determine a first number of repetitive transmission based on one or more random access related parameters, and send a random access message one or more times according to the first number.

In another implementation, the system and method are configured to determine whether to enhance an uplink transmission based on one or more random access related parameters. In another implementation, the system and method are further configured to determine not to enhance the uplink transmission, and send a legacy random access message. In another implementation, the system and method are configured to determine to enhance the uplink transmission, and send an enhanced random access message.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In various wireless implementations it is advantageous to ensure coverage and transmit low-latency and high-reliability services within a short transmission time. Thus, in some implementations, it is advantageous to transmit by one or more methods of uplink (UL) transmission. In some implementations, a Msg3 PUSCH scheduled by a RAR UL grant in Type-1 random access procedure under various protocols is only transmitted once. Further, in some implementations, under a Type-2 random access procedure, the PUSCH of Msg A is only transmitted once.

In some implementations, under various protocols, it is advantageous to meet one or more coverage requirements with one or more of a Msg3 PUSCH and a Msg A PUSCH. In some implementations, coverage requirements for one or more of a Msg3 PUSCH and a Msg A PUSCH include introducing multiple repetitions. Further, it is advantageous to meet the coverage requirement or requirements with one or more alternative, complementary, or like repetition transmission types. In some implementations, the terminal determines the type of repetitive transmission and how to obtain the number of repetitions.

Figure 1:
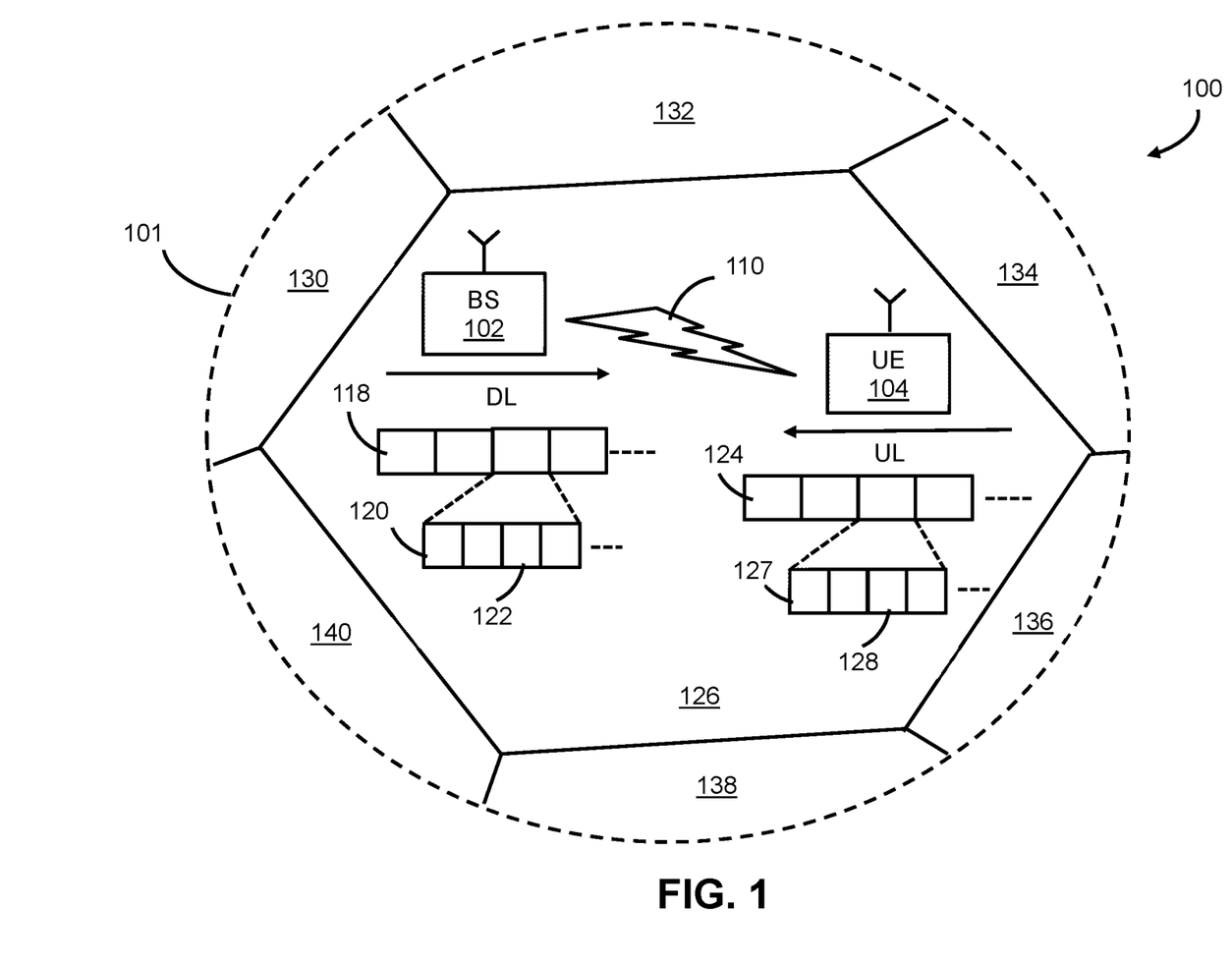
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
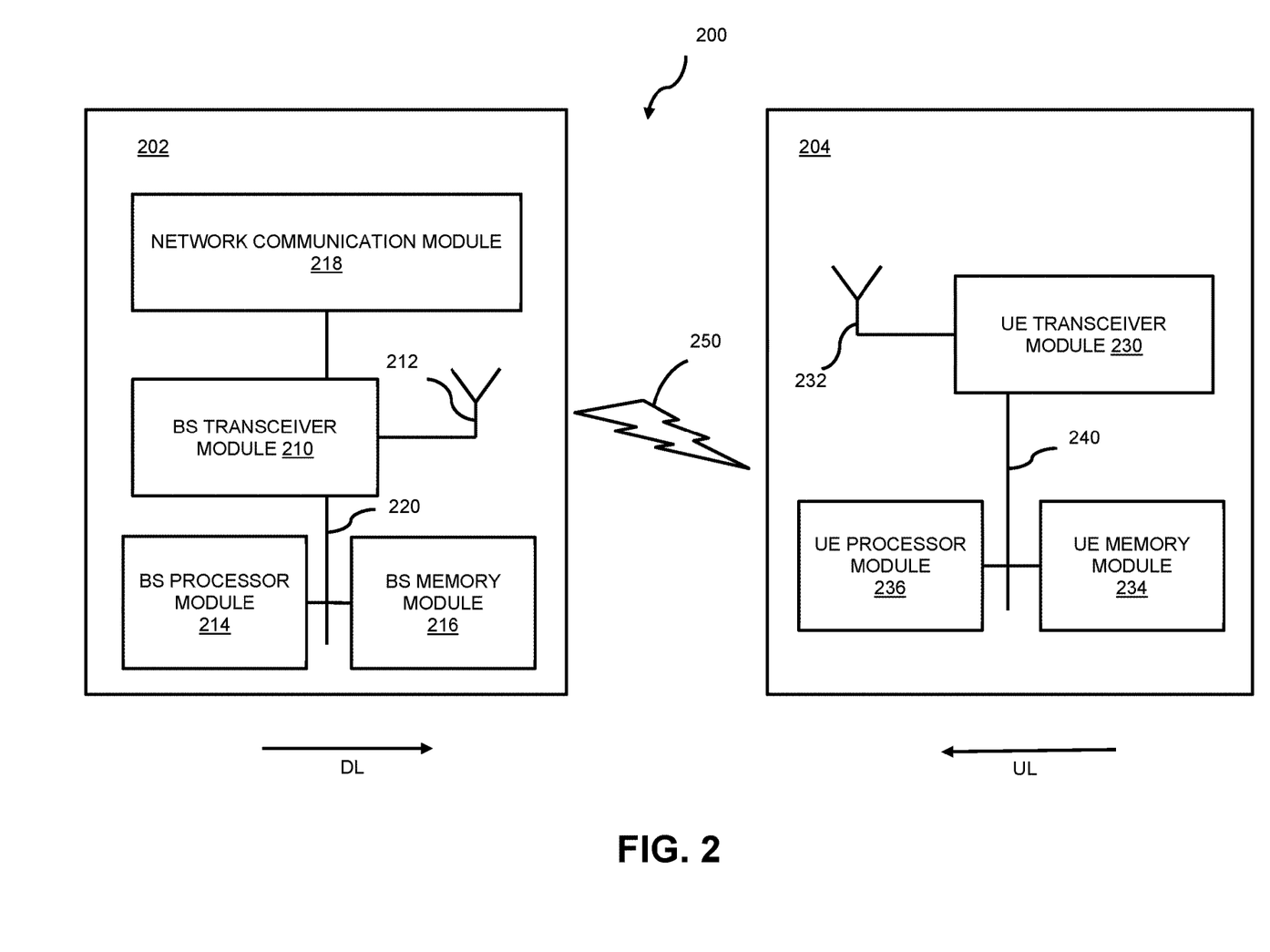
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
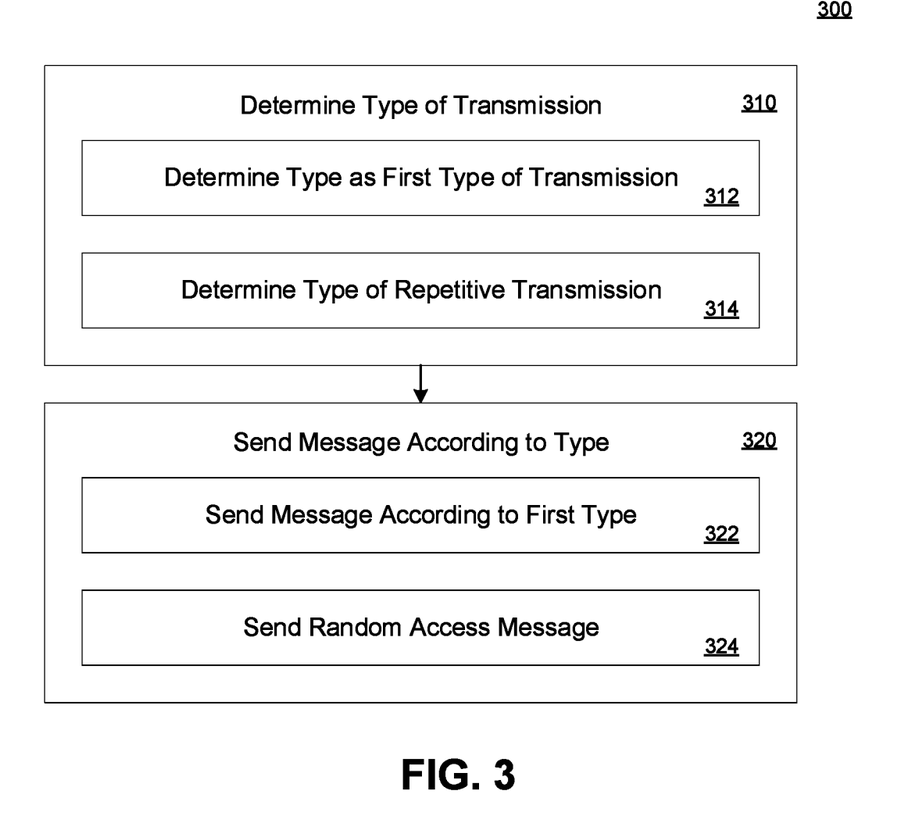
FIG. 3 illustrates a first example method, in accordance with some embodiments of the present disclosure.

FIG. 3 illustrates a first example method, in accordance with some embodiments of the present disclosure. In some implementations, at least one of the BS 202 and the UE 204 performs method 300 according to present implementations. In some implementations, the method 300 begins at step 310. At step 310, an example system determines a first type of repetitive transmission based on one or more random access related parameters. In some implementations, step 310 includes at least one of steps 312 and 314. The method 300 then continues to step 320. At step 320, the example system sends a random access message according to the first type. In some implementations, step 320 includes at least one of steps 322 and 324. In some implementations, method 300 ends at step 320.

In some implementations, multiple types of repetitive transmission occur when performing one or more communication operations. In some implementations, communication operations include one or more of performing coverage enhancement for Msg3 PUSCH of Type-1 random access procedure, adopting the enhancement technique of multiple repeated transmission of Msg3 PUSCH, and adopting the enhancement of multiple repeated transmission of PUSCH of Msg A of Type-2 random access procedure Technology. As one example, repetition type A can refer to the type of repetitive transmission based on time slots, including transmission once in each time slot. As another example, repetition type B can refer to a type of repetitive transmission based on mini-slots, including one or more repeated transmissions in one time slot. Thus, in some implementations, it is advantageous for a terminal to determine which type of repeated transmission to use for a particular PUSCH transmission.

In some implementations, a terminal can determine repeated transmission type. In some implementations, a terminal can determine repeated transmission type according to PRACH (Physical Random-Access Channel) or preamble. In one implementation, different groups of preambles and different repeated transmission types are grouped by pre-configured mapping relationships. For example, a preamble sequence can be divided into two groups, where group 1 is mapped to repeated transmission type 1, and group 2 is mapped to repeated transmission type 2. In this example, when the terminal sends the preamble of group 1, the base station configures the sending mode of repeated transmission type 1. In this example, when the terminal sends the group 2 preamble, the base station configures the repeat type 2 sending mode.

In one implementation, domain resources different by PRACH time-frequency and different repetition types are grouped by pre-configured mapping relationships. For example, when the terminal uses PRACH resource 1 to send the preamble, the base station configures the sending mode of repeated transmission type 1. When the terminal uses PRACH resource 2 to send the preamble, the base station configures the sending mode of repeated transmission type 2.

In one implementation, different formats of preambles and different repetition types are grouped by pre-configured mapping relationships. For example, when the terminal uses preamble format 1 to send the preamble, the base station configures the sending mode of repeated transmission type 1. When the terminal uses preamble format 2 to send the preamble, the base station configures the sending mode of repeated transmission type 2.

In one implementation, a repetition type of a preamble has a mapping relationship to a repetition type of Msg3. As one example, the two can be the same. In this example, where the preamble is of repeat type 1, Msg3 is also of repeat type 1. As another example, the two can also be reversed. In this example, where the preamble is of repeat type 1, Msg3 is of repeat type 2.

In some implementations, a terminal can determine a repeated transmission type according to the RA-RNTI scrambled DCI format to notify the repetition type. In one implementation, a terminal can determine a repeated transmission type according to the RA-RNTI scrambled DCI format 1_0 in the reserved bits to take out one or more bits for notification. As one example, the number of bits can be 1 bit. In one implementation, a terminal can determine a repeated transmission type according to joint coding with the TDRA table in DCI format 1_0 scrambled by RA-RNTI.

For example, a new column can be introduced in the TDRA table to notify the repeat type. In one implementation, repeat type 1 is determined when the TDRA form in the DCI format 1_0 scrambled by RA-RNTI informs the time-domain resource with SLIV (Start and length indicator value). Further, in one implementation, repeat type 2 is determined when the TDRA form uses S (Start symbol) and when the time-domain resource is notified with L (Length).

In some implementations, a terminal can determine repeated transmission type by a notification in a RAR UL grant (Random Access Response Grant). In one implementation, a terminal introduces several bits in RAR UL grant to indicate transmission type. In one implementation, a notification is coded in a PUSCH time resource allocation in RAR UL grant. Specifically, in some implementations, it is coded jointly with TDRA of PUSCH time resource allocation and introduces a column in TDRA to notify the repetition type.

In one implementation, repeat type 2 is determined when the TDRA form in the PUSCH time resource allocation in the RAR UL grant uses SLIV to notify time-domain resources. Further, in one implementation, another repeat type is determined when the TDRA form uses S and L to notify time-domain resources. In one implementation, a terminal indicates repetition type with a CSI request field of the RAR UL grant. Thus, in some implementations, when the UE needs to detect this field, this field is used to indicate the repetition type. In some implementations, a terminal can determine repeated transmission type by at least one notification in RRC IE msgA-PUSCH-Config. In one implementation, a terminal introduces an independent information field in msgA-PUSCH-Config to notify of the repetition type. In one implementation, notification is or includes joint coding with TDRA and introduces a column in TDRA of the signaling domain msgA-PUSCH-timeDomainAllocation in msgA-PUSCH-Config.

Figure 4:
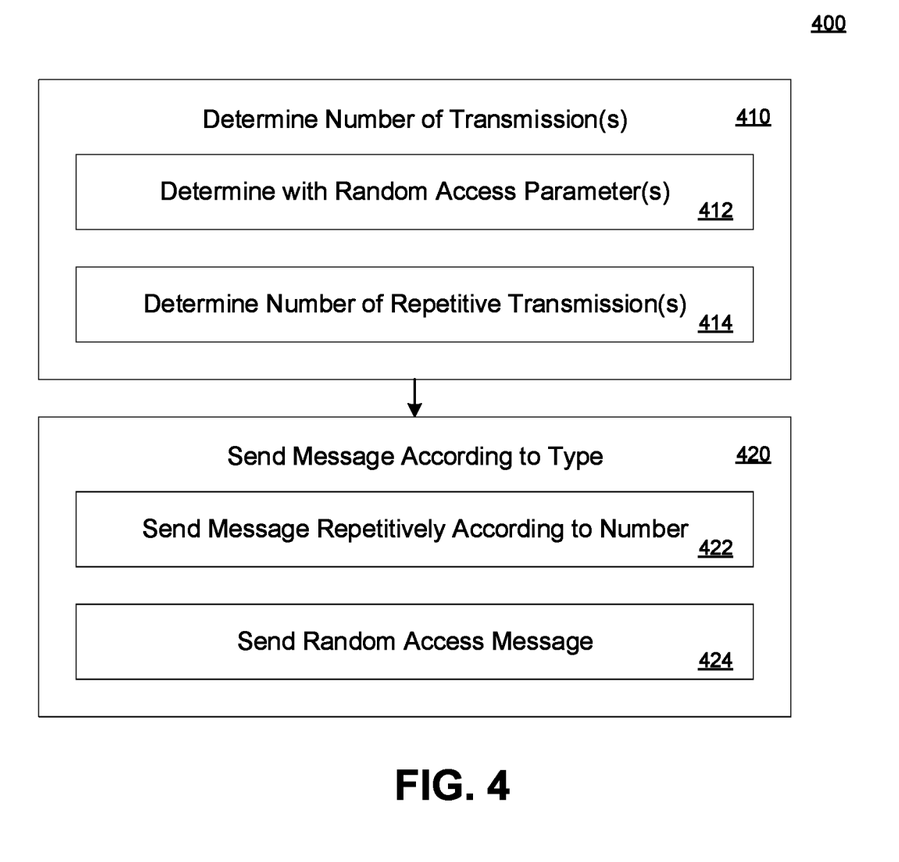
FIG. 4 illustrates a second example method, in accordance with some embodiments of the present disclosure.

FIG. 4 illustrates a second example method, in accordance with some embodiments of the present disclosure. In some implementations, at least one of the BS 202 and the UE 204 performs method 400 according to present implementations. In some implementations, the method 400 begins at step 410. At step 410, an example system determines a first number of repetitive transmissions based on one or more random access related parameters. In some implementations, step 410 includes at least one of steps 412 and 414. The method 400 then continues to step 420. At step 420, an example system sends a random access message one or more times according to the first number. In some implementations, step 420 includes at least one of steps 422 and 424. In some implementations, method 400 ends at step 420.

In some implementations, multiple types of repetitive transmission occur when performing one or more communication operations. In some implementations, communication operations include one or more of performing coverage enhancement on the Msg3 PUSCH of Type-1 random access procedure, performing coverage enhancement on the PUSCH of Msg A of Type-2 random access procedure. In some implementations, the enhancement technology of multiple repeated transmissions of Msg3 PUSCH or Msg A PUSCH is performed based at least partially on time. Thus, in some implementations, it is advantageous for a terminal to determine the number of repeated transmissions.

In some implementations, a terminal can determine a number of transmissions to be repeated. In one implementation, a terminal can determine a number of transmissions to be repeated according to PRACH or preamble. In one implementation, different groups of preambles and different repetitive times are grouped by pre-configured mapping relationships. For example, a preamble sequence can be divided into two groups. Further, in this example, group 1 can be mapped to the number of repeated transmissions A, and group 2 can be mapped to the number of repeated transmissions B. Thus, in one implementation, when the terminal sends the preamble of group 1, the number of repetitions configured by the base station is equal to A. Further, in one implementation, when the terminal sends the preamble of group 2, the base station configures the number of repetitions equal to B.

In one implementation, different PRACH time-frequency domain resources and different repetitive times are grouped by a pre-configured mapping relationship. For example, when the terminal uses PRACH resource 1 to send the preamble, the base station configures the number of repeated transmissions to be equal to A. Further, in this example, when the terminal uses PRACH resource 2 to send the preamble, the base station configures the number of repeated transmissions to be equal to B.

In one implementation, different formats of preamble and different repetitive times a grouped by a pre-configured mapping relationship. For example, when the terminal uses preamble format 1 to send the preamble, the base station configures the number of repeated transmissions to be equal to A. When the terminal uses preamble format 2 to send the preamble, the base station configures the number of repeated transmissions equal to B.

In one implementation, repetition times of the preamble and repetition times of Msg3 are grouped by a mapping relationship. As one example, the two can be the same. In this example, when the preamble is the number of repetitions A, then Msg3 is also the number of repetitions A. As another example, the number of repetitions corresponds to a sum of the length of the preamble and the offset. Thus, in this example, when the preamble is the number of repetitions B, then the number of repetitions of Msg3 is equal to the sum of B and the offset. In some implementations, the offset is pre-configured or notified by RRC.

In some implementations, a terminal determines a number of transmissions to be repeated according to the RA-RNTI scrambled DCI format. In some implementations, the terminal also includes a notification of the number of repeated transmissions. In one implementation, a terminal can determine a number of transmissions according to the RA-RNTI scrambled DCI format 1_0 in the reserved bits to take out several bits as notification. As one example, notification can be 3 bits in length. In one implementation, a terminal determines a number of transmissions joint coding with the TDRA table in DCI format 1_0 scrambled by RA-RNTI. For example, a new column is introduced in the TDRA table to notify the number of repeated transmissions.

In some implementations, a terminal can determine a number of transmissions to be repeated by a notification in a RAR UL grant. In one implementation, a terminal introduces several bits in RAR UL grant to indicate a notification or association with a notification. In one implementation, a terminal codes a notification in a PUSCH time resource allocation in RAR UL grant. Specifically, it is coded jointly with TDRA of PUSCH time resource allocation, and a column is introduced in TDRA to notify the number of repeated transmissions.

In some implementations, a terminal determines a number of transmissions to be repeated according to the number of repetitions of the preamble. In some implementations, when none of the above methods of notifying the number of repetitions is used, detected, available, or the like, the UE obtains the number of repetitions of Msg3/Msg A. In some implementations, the terminal obtains the number of repetitions of Msg3/Msg A according to one or more implementations in accordance with present implementations.

In some implementations, a terminal can determine a number of transmissions to be repeated by a notification in an RRC IE msgA-PUSCH-Config. In one implementation, a terminal introduces an independent information field in msgA-PUSCH-Config to notify or indicate the number of repetitions. In one implementation, a terminal performs coding with TDRA, and a column is introduced in TDRA of the signaling domain msgA-PUSCH-timeDomainAllocation in msgA-PUSCH-Config.

Figure 5:
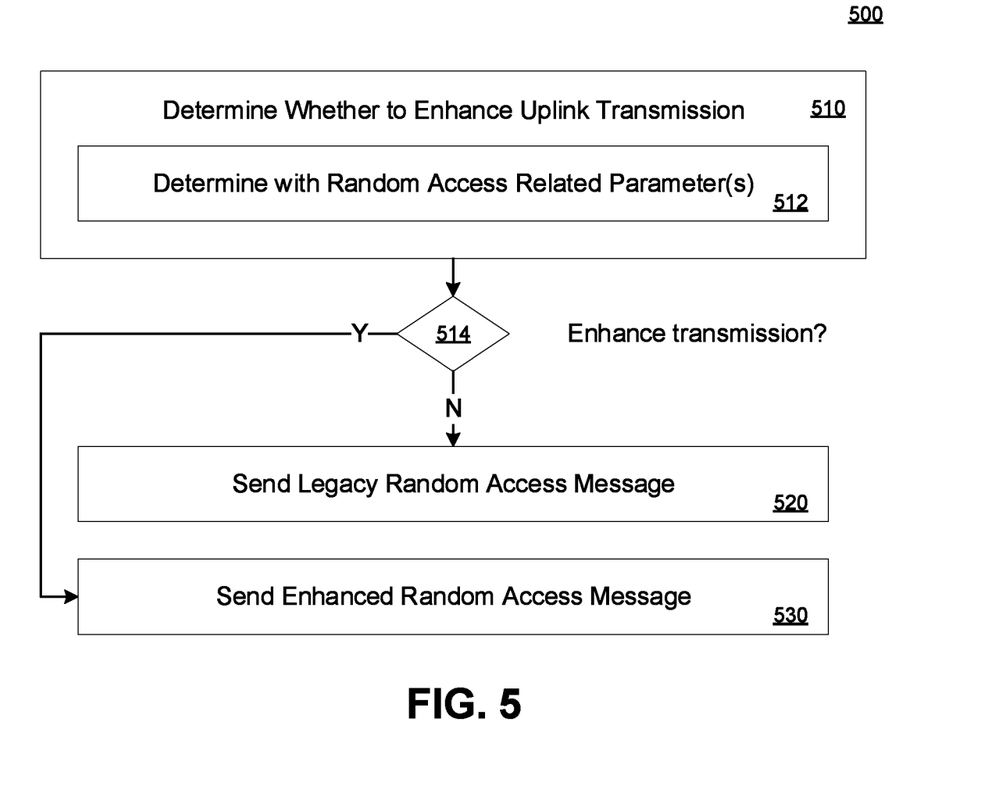
FIG. 5 illustrates a third example method, in accordance with some embodiments of the present disclosure.

FIG. 5 illustrates a third example method, in accordance with some embodiments of the present disclosure. In some implementations, at least one of the BS 202 and the UE 204 performs method 500 according to present implementations. In some implementations, the method 500 begins at step 510. At step 510, an example system determines whether to enhance an uplink transmission based on one or more random access related parameters. In some implementations, step 510 includes step 512. The method 500 then continues to step 520. At step 520, the example system determines whether to enhance the transmission. In accordance with a determination to enhance the transmission, the method 500 then continues to step 530. Alternatively, in accordance with a determination to not enhance the transmission, the method 500 then continues to step 520. At step 520, the terminal sends a legacy random access message. At step 530, the terminal sends an enhanced random access message.

In some implementations, it is advantageous for a terminal to notify the base station that the terminal supports Msg3 PUSCH or Msg A PUSCH coverage Enhanced transmission. In some implementations, multiple types of repetitive transmission occur when performing one or more communication operations. In some implementations, communication operations include one or more of performing coverage on Msg3 PUSCH of Type-1 random access procedure, and performing coverage enhancement on PUSCH of Msg A of Type-2 random access procedure.

In some implementations, a terminal notifies that it supports Msg3 PUSCH or Msg A PUSCH coverage enhancement. In one implementation, different groups of preambles are grouped by a pre-configured mapping relationship to one or more of Msg3 and Msg A enhanced capabilities. As one example, the preamble sequence can be divided into two groups. In this example, group 1 is mapped to not support Msg3 or Msg A enhancement. Further, in this example, group 2 is mapped to support Msg3 or Msg A enhancement. Thus, in this example, when the terminal sends the preamble of group 1, the terminal reports that it supports legacy Msg3 or Msg A. Further, in this example, when the terminal sends the preamble of group 2, the terminal reports that it supports the enhancement of Msg3 or Msg A.

In one implementation, different PRACH time-frequency domain resources and Msg3 or Msg A enhanced capabilities are grouped by a pre-configured mapping relationship. For example, when the terminal uses PRACH resource 1 to send the preamble, the terminal reports that it supports legacy Msg3 or Msg A. In this example, when the terminal uses PRACH resource 2 to send the preamble, the terminal report is to support Msg3 or Msg A enhancement.

In one implementation, different formats of preamble and Msg3 or Msg A enhanced capabilities are grouped by a pre-configured mapping relationship. For example, when the terminal uses preamble format 1 to send the preamble, the terminal reports that it supports legacy Msg3 or Msg A. In this example, when the terminal uses the preamble format 2 to send the preamble, the terminal report is to support Msg3 or Msg A enhancement.

In one implementation, a table is configured. The table can include the number of repetitions, repetition type, enhanced uplink transmission, legacy uplink transmission, enhanced DMRS pattern, legacy DMRS pattern, and segmented TB. The table is indicated by SIB (System Information Block) or RRC (Radio Resource Control) signal or fixed by standard.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   determining, by a wireless communication device, a first type of repetitive transmission based on one or more random access related parameters preconfigured to correspond to the first type, the one or more random access related parameters corresponding to a random access message to be sent uplink, the one or more random access related parameters comprising at least one of: a preamble or a physical random access channel; and
   sending, by the wireless communication device to a wireless communication node, the random access message according to the first type, the random access message causing the wireless communication node to configure a sending mode of the first type of repetitive transmission.

2. The wireless communication method of claim 1, further comprising determining, by the wireless communication device, that the preamble belongs to a group of preambles preconfigured to correspond to the first type.

3. The wireless communication method of claim 1, further comprising determining, by the wireless communication device, that the physical random access channel is preconfigured with one or more resources corresponding to the first type.

4. The wireless communication method of claim 1, further comprising determining, by the wireless communication device, that the preamble has a format preconfigured to correspond to the first type.

5. The wireless communication method of claim 1, further comprising:
   determining, by the wireless communication device, that the preamble corresponds to a second type of repetitive transmission; and
   determining, by the wireless communication device, the first type to be identical to or different from the second type.

6. A wireless communication method, comprising:
   determining, by a wireless communication device, a first type of repetitive transmission based on one or more random access related parameters preconfigured to correspond to the first type, the one or more random access related parameters corresponding to a random access message to be sent uplink, the one or more random access related parameters comprising a random access radio network temporary identifier and a downlink control information format; and
   sending, by the wireless communication device to a wireless communication node, the random access message according to the first type, the random access message causing the wireless communication node to configure a sending mode of the first type of repetitive transmission.

7. The wireless communication method of claim 6, further comprising identifying, by the wireless communication device, information indicated in the downlink control information format to determine the first type, wherein the downlink control information format is scrambled by the random access radio network temporary identifier.

8. The wireless communication method of claim 6, further comprising identifying, by the wireless communication device, information indicated in a time domain resource allocation table of the downlink control information format to determine the first type, wherein the downlink control information format is scrambled by the random access radio network temporary identifier.

9. The wireless communication method of claim 6, further comprising:
identifying, by the wireless communication device, an indication type to indicate a time domain resource allocation table of the downlink control information format; and
using, by the wireless communication device, the indication type to determine the first type.

10. A wireless communication method, comprising:
determining, by a wireless communication device, a first type of repetitive transmission based on one or more random access related parameters preconfigured to correspond to the first type, the one or more random access related parameters corresponding to a random access message to be sent uplink, the one or more random access related parameters include a random access response grant, wherein information indicated in the random access response grant is identified to determine the first type, the information being indicated in at least one of a time domain resource allocation table or a channel state information request field of the random access response grant; and
sending, by the wireless communication device to a wireless communication node, the random access message according to the first type, the random access message causing the wireless communication node to configure a sending mode of the first type of repetitive transmission.

11. The wireless communication method of claim 10, further comprising:
identifying, by the wireless communication device, an indication type to indicate the time domain resource allocation table of the random access response grant; and
using, by the wireless communication device, the indication type to determine the first type.

12. A wireless communication method, comprising:
determining, by a wireless communication device, a first type of repetitive transmission based on one or more random access related parameters preconfigured to correspond to the first type, the one or more random access related parameters corresponding to a random access message to be sent uplink, the one or more random access related parameters comprise a radio resource signaling information element; and
sending, by the wireless communication device to a wireless communication node, the random access message according to the first type, the random access message causing the wireless communication node to configure a sending mode of the first type of repetitive transmission.

13. The wireless communication method of claim 12, further comprising identifying, by the wireless communication device, information indicated in the radio resource signaling information element to determine the first type.

* * * * *